United States Patent

[11] 3,627,368

| [72] | Inventor | Harold Eugene Baughman<br>243 San Fernando Way, Daly City, Calif. 94015 |
|---|---|---|
| [21] | Appl. No. | 71,480 |
| [22] | Filed | Sept. 11, 1970 |
| [45] | Patented | Dec. 14, 1971 |

[54] LITTER COLLECTOR AND REMOVABLE HOOD MEANS THEREFOR
10 Claims, 11 Drawing Figs.

| [52] | U.S. Cl. | 294/55, 294/59 |
|---|---|---|
| [51] | Int. Cl. | A01d11/00, A47f 13/08 |
| [50] | Field of Search | 294/26.5, 51, 59, 55; 220/4 |

[56] References Cited
UNITED STATES PATENTS

| 2,315,831 | 4/1943 | Wilcox | 294/51 |
|---|---|---|---|
| 1,442,671 | 1/1923 | Krehbiel | 294/51 |

Primary Examiner—Evon C. Blunk
Assistant Examiner—I. Kenneth Silverman
Attorney—Snyder and Butrum ABSTRACT: A receptacle means has three attaching portions secured to the two sides and the rear thereof. A removable hood means also includes three corresponding spaced attaching portions secured to the sides and rear thereof. The hood means comprises a rigid framework and an open covering such as a metallic screen thereover. The attaching portions on the receptacle means and the hood means enables the hood means to be quickly connected and disconnected with respect to the receptacle means. A carrying handle is provided in one form of the invention for carrying the overall assembly.

PATENTED DEC 14 1971

INVENTOR
HAROLD E BAUGHMAN

BY

ATTORNEY

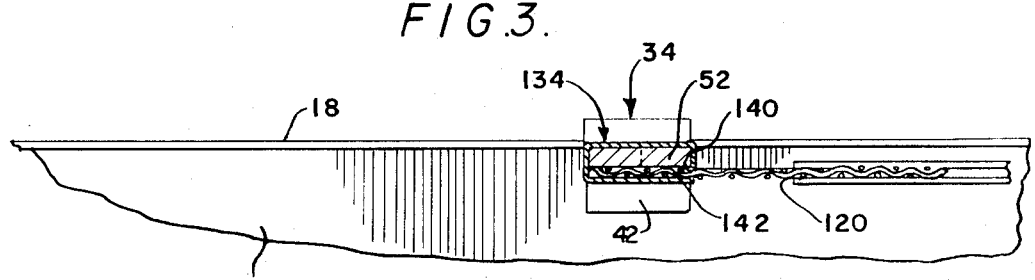
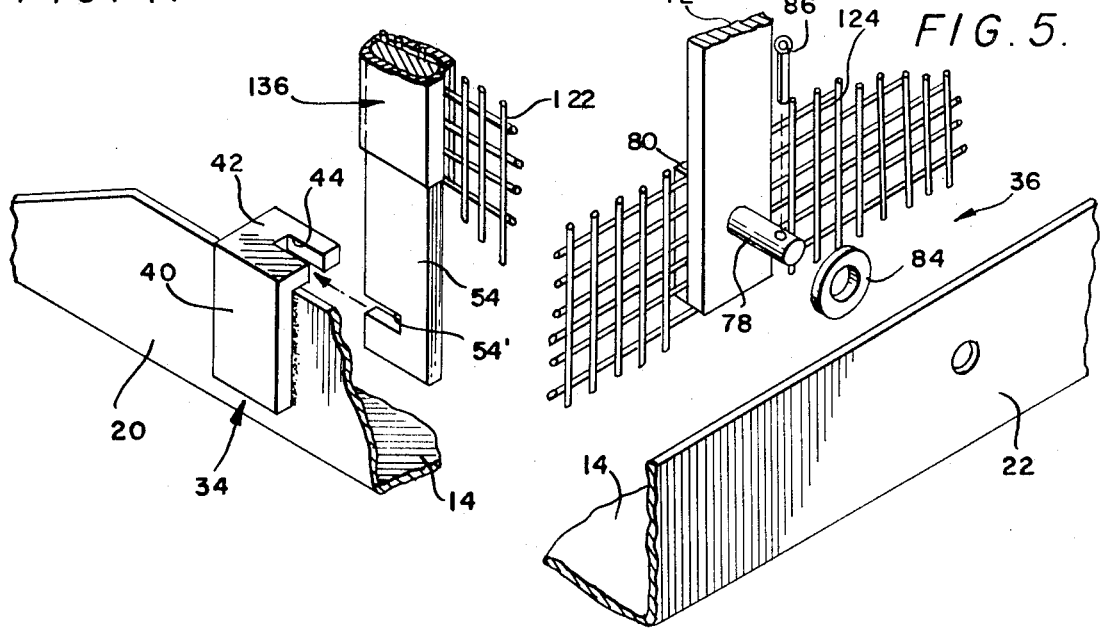
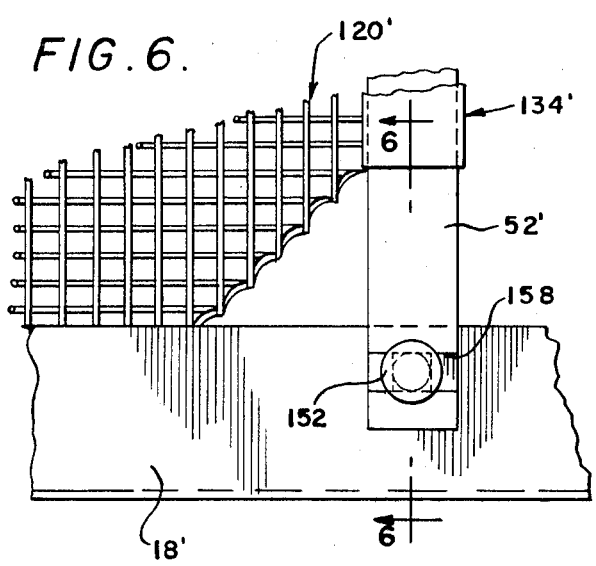
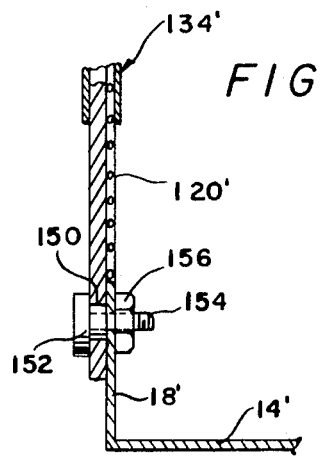
INVENTOR
HAROLD E. BAUGHMAN

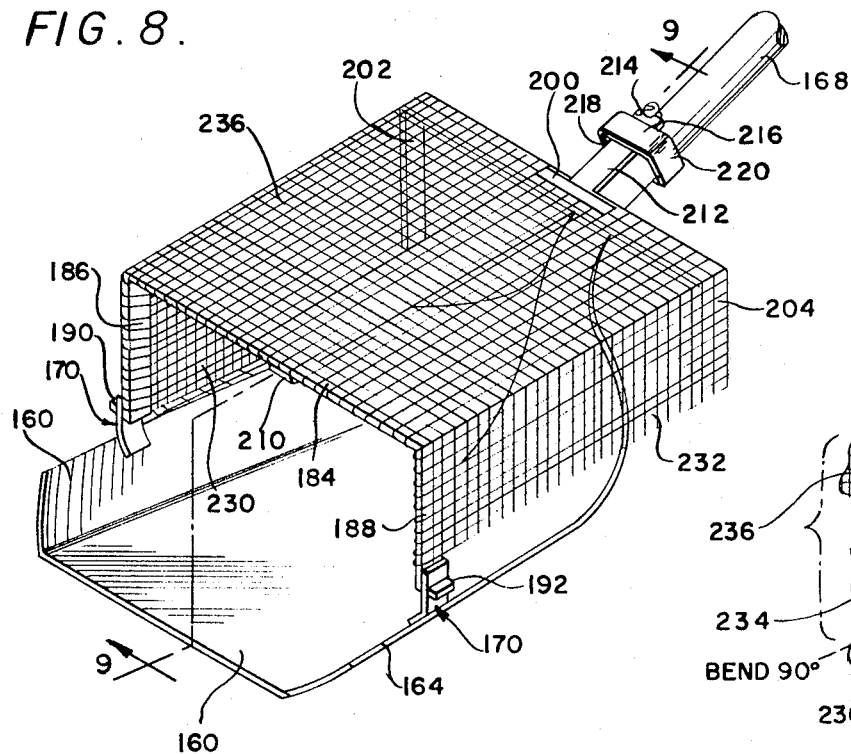
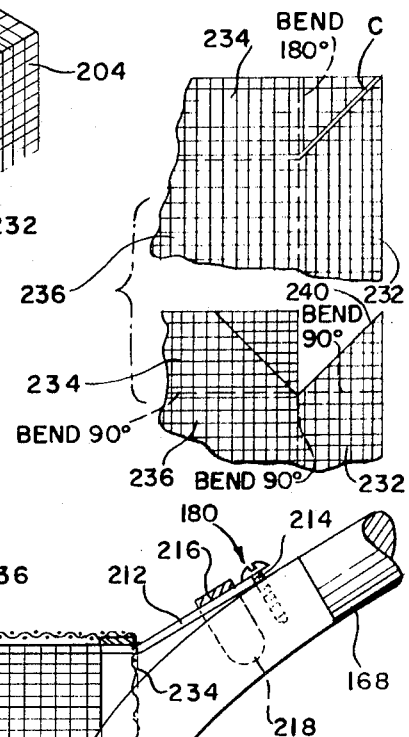
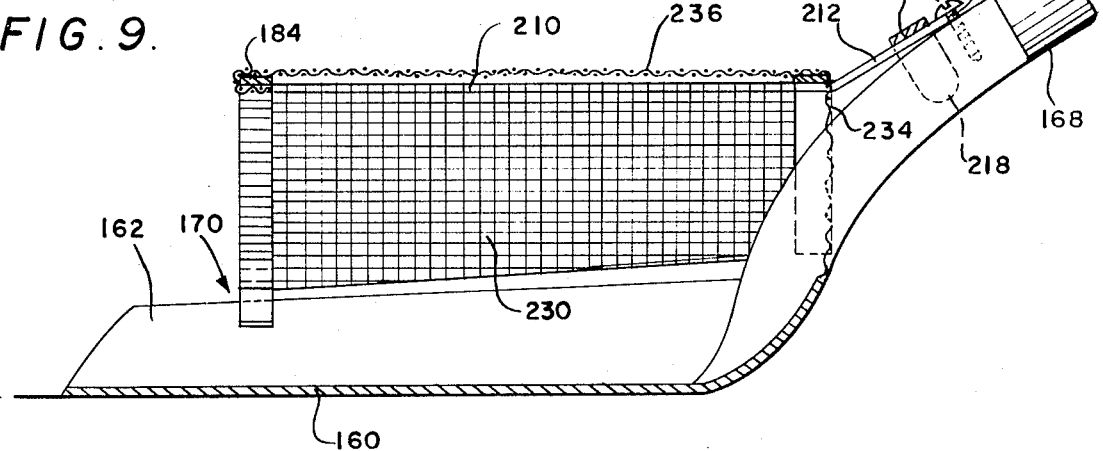
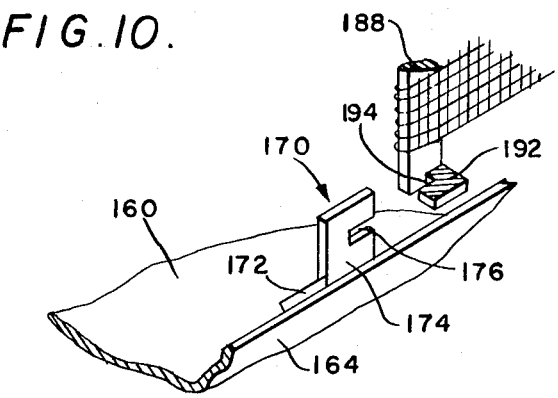
INVENTOR
HAROLD E. BAUGHMAN 3,627,368

LITTER COLLECTOR AND REMOVABLE HOOD MEANS THEREFOR

BACKGROUND OF THE INVENTION

The present invention relates to litter collectors for collecting all kinds of litter and debris such as paper, bottles, cans, heavy soil, sand and the like. This type of litter collector can be slid along a curb or a similar location where litter and debris is likely to accumulate and the litter and debris can be swept into the collector.

A particular problem arises when litter is being collected under windy conditions since paper and the like tend to be blown away from the collector. It is accordingly desirable to provide a hood means to prevent lighter material such as paper and the like from being blown away from the receptacle means of the device. When such a hood means is employed, it is subject to damage in use and accordingly should be of such a construction that it may be readily connected and disconnected with respect to the receptacle means without the necessity of utilizing special tools. Additionally, the attaching means should be of such a nature that the hood means is retained firmly in place with respect to the receptacle means when in use.

SUMMARY OF THE INVENTION

The receptacle means of the present invention includes attaching portions at each side portion thereof and at the rear portion thereof. The removable hood means similarly includes attaching portions at each side portion thereof and at the rear portion thereof. Attaching portions on the receptacle means and the removable hood means are of such a nature that they enable the hood means to be quickly connected and disconnected with respect to the receptacle means.

The receptacle means includes a front litter-receiving edge which is elongated and disposed a substantial distance forwardly of the front part of the hood means so as to enable debris to be effectively swept into the device. Adjusting means is provided at the rear part of the receptacle means to enable the tilt angle of the receptacle means to be adjusted and to thereby maintain the front litter-receiving edge in proper position.

When the hood means is in operative position with respect to the receptacle means, the device can be readily employed under windy conditions since the hood means will prevent light material such as paper and the like from being blown away. The hood means can be readily connected and disconnected with respect to the receptacle means since the attaching portions on the receptacle means and the hood means enable the attachment to be made simply by sliding the attaching portions into engagement with one another. When in engagement with one another, the portions of the structure are so dimensioned that the hood means will be securely held in place.

A handle is provided in one form of the invention for facilitating carrying of the overall assembly. This hood means includes a fixed portion for carrying relatively heavy loads and a pivoted portion which effectively serves as an extension of the handle so as to minimize the amount of stooping which a person has to perform in order to grasp the handle of the device when the structure is resting on the ground.

BRIEF DESCRIPTION OF THE DRAWINGS

FIG. 3 is a sectional view on an enlarged scale taken substantially along line 3—3 of FIG. 2 looking in the direction of the arrows;

FIG. 4 is a top perspective exploded view partly broken away illustrating the attaching portions at the sides of the apparatus;

FIG. 5 is a top perspective exploded view partially broken away illustrating the attaching portions at the rear of the apparatus;

FIG. 6 is a side view partly broken away of a modified form of the invention;

FIG. 7 is a sectional view taken substantially along line 7—7 of FIG. 6 looking in the direction of the arrows;

FIG. 8 is a top perspective view of a modified form of the invention;

FIG. 9 is a sectional view on an enlarged scale taken substantially along line 9—9 of FIG. 8 looking in the direction of the arrows;

FIG. 10 is a top perspective view partly broken away illustrating the attaching portions at the side of the apparatus; and, FIG. 11 is a view illustrating two steps in the formation of a corner of the screen covering of the hood means.

DESCRIPTION OF THE PREFERRED EMBODIMENTS

Figure 1:
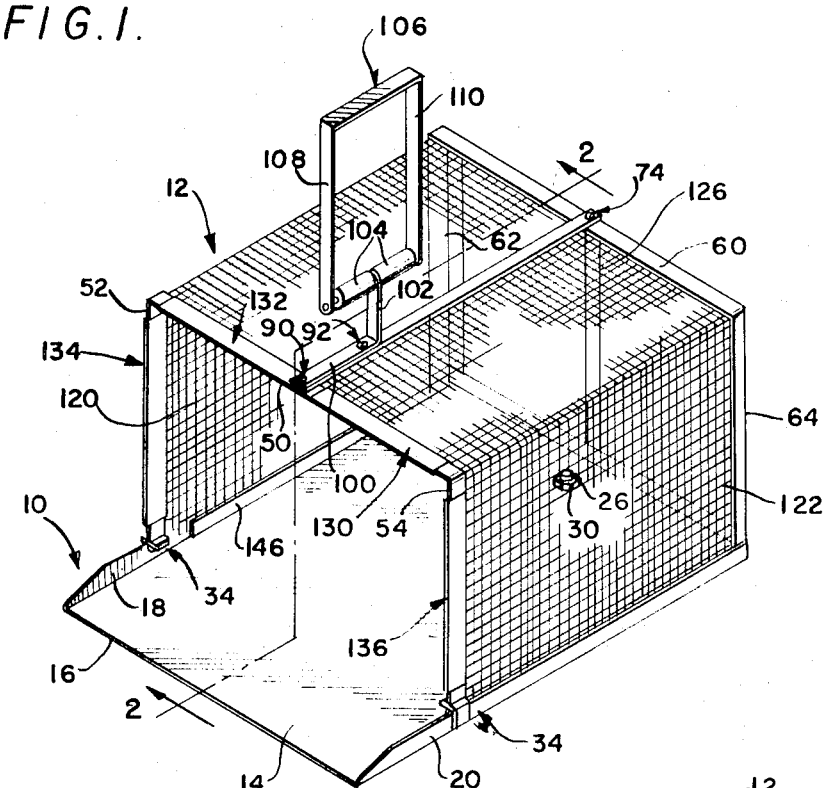
FIG. 1 is a top perspective view of a first form of the invention.

Referring now to the drawings wherein like characters designate corresponding parts throughout the several views, a first form of the invention is illustrated in FIGS. 1–5 inclusive. The litter collector according to this embodiment of the invention includes a receptacle means indicated generally by reference numeral 10 and a hood means indicated generally by reference numeral 12.

The receptacle means comprises a rigid flat body portion 14 formed of a suitable metallic substance and having a front elongated litter receiving edge 16. The body portion includes integral upwardly extending flanges 18 and 20 at opposite sides thereof joining with a flange 22 at the rear thereof.

Figure 2:
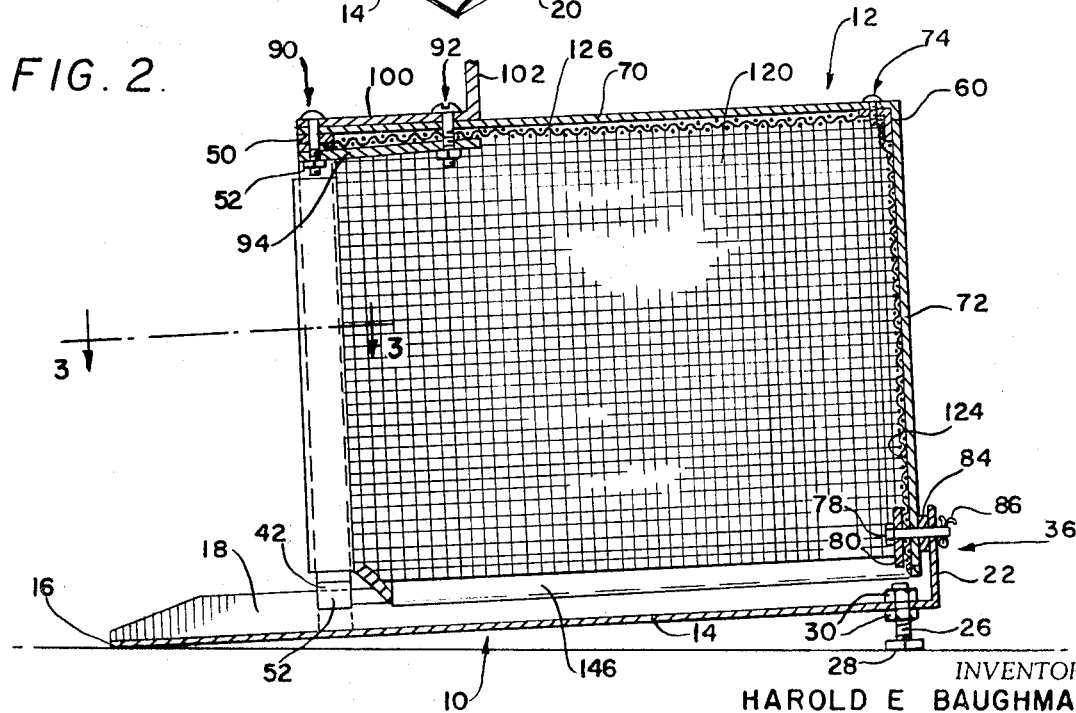
FIG. 2 is a sectional view on an enlarged scale taken substantially along line 2—2 of FIG. 1 looking in the direction of the arrows.

As seen most clearly in FIG. 2, adjusting means is provided adjacent the rear portion of the receptacle means and comprises a threaded screw 26 having an enlarged head 28 adapted to rest on the adjacent supporting surface, this adjusting screw extending through a suitable hole provided in body portion 14. A pair of locknuts 30 are threaded on screw 26 and serve to hold the screw in any desired operative position with respect to the body portion thereby enabling the tilt angle of the receptacle means to be adjusted as required to maintain the front litter-receiving edge 16 in proper operative position.

The receptacle means includes attaching means comprising three spaced attaching portions, a pair of similar attaching portions 34 being provided at opposite sides of the receptacle means and being secured to flanges 18 and 20 respectively. A further attaching portion 36 is provided at the rear portion of the receptacle means in flange 22. As seen in FIG. 4, each of attaching portions 34 includes a generally L-shaped member having a pair of legs 40 and 42 disposed at substantially right angles to one another, the leg 40 being secured as by welding or the like to the associated flange of the receptacle means. Leg 42 has a rearwardly facing elongated slot 44 formed therein.

Attaching portion 36 at the rear of the receptacle means comprises a hole formed through flange 22 which cooperates with a number of components hereinafter described.

The hood means includes a rigid framework having a front crossmember 50 terminating in two downwardly extending legs 52 and 54 at the opposite ends thereof, these legs extending substantially normally to member 50. The lower ends of legs 52 and 54 have elongated slots formed therein, one of such slots 54′ being seen in FIG. 4, these slots cooperating with the slots in the two attaching portions 34 provided at opposite sides of the receptacle means whereby the two forward side portions of the hood means are adapted to be readily interconnected with the receptacle means.

The framework includes a rear crossmember 60 disposed substantially parallel with member 50, a pair of depending legs 62 and 64 being provided at the opposite ends of member 60 and extending substantially normally therefrom. Legs 62 and 64 are disposed substantially parallel with legs 52 and 54. Each of portions 60, 62 and 64 is of generally L-shaped cross section, and legs 52 and 54 as well as legs 62 and 64 are adapted to fit within the opposite flanges 18 and 20 of the receptacle means.

The framework includes a central longitudinally extending rigid member including legs 70 and 72 disposed at substantially right angles to one another. This member is secured by nut and bolt assembly 74 to member 60.

As seen in FIGS. 2 and 5, a bolt 78 serves to hold in place a transversely extending frame member 80 having the opposite ends thereof spaced slightly from leg portions 62 and 64. The bolt extends through suitable holes formed in members 22, 72 and 80 as well as a washer 84. A cotter pin 86 extends through a diametrically extending hole formed in the outer end of bolt 78 to hold the components in assembled position but permitting ready disassembly when desired.

As seen in FIGS. 1 and 2, a pair of nut and bolt assemblies 90 and 92 serve to interconnect leg 70 of the longitudinally extending frame member with a flat bar 94 disposed therebeneath and base portion 100 of a handle, this base portion joining with an upwardly extending portion 102.

The handle includes fixed portions 104 for carrying relatively heavy loads and a further movable portion 106 of generally U-shaped configuration and including a pair of parallel legs 108 and 110 which are pivotally connected with the opposite ends of the fixed handle portions 104. Movable portion 106 of the handle can be employed in the position as shown in FIG. 1 so as to facilitate lifting of the overall assembly without excessive stooping, and, on the other hand, this movable portion 106 can be pivoted into a lowered position so that the overall assembly can be carried by the fixed handle portions 104.

The hood means also includes an open covering supported on the framework and as illustrated comprises a wire screen. It should be understood that this covering may also comprise other materials such as plastic or fabric supported on the rigid framework. The covering includes opposite side portions 120 and 122, a rear portion 124 and a top portion 126. The forward edges of the top portion 126 of the screen are connected by metallic clips 130 and 132 to member 50 of the framework. The forward edges of sides 120 and 122 of the screen are connected by metallic clips 134 and 136 to legs 52 and 54 respectively of the framework.

These clips have similar cross-sectional configurations and as seen in FIG. 3 clip 134 is wrapped around leg 52 and includes spaced portions 140 and 142 between which the forward edge of portion 120 of the screen is clampingly received for holding the screen in operative position with respect to the framework.

The top portion 126 of the screen is clamped in place by flattened bar 94 previously described and nut and bolt assembly 74 also serves to hold the screen in place with respect to member 60 of the framework. The lower edge of rear portion 124 of the screen is clamped in operative position by transversely extending member 80.

Generally U-shaped clips 146 are clamped around the lower edges of opposite side portions 120 and 122 of the screen to rigidify such lower edges and to provide a smooth surface so as to prevent any litter or debris from being caught between the lower edges of the screen and the adjacent flanges of the receptacle means.

When the hood means is placed in the operative position illustrated with the three attaching portions on the hood means and in engagement with the three attaching portions on the receptacle means, the parts are so dimensioned that forwardly facing lug 48 at the rear of the receptacle means engages the rear portion of the hood means and tends to bias the hood means forwardly so that the attaching portions at the side portions of the hood means and the receptacle means are maintained in firm engagement with one another. The receptacle means is relatively rigid while the hood means is of a somewhat resilient construction. Accordingly, the spacing of the attaching portions at the sides of the hood means from the attaching portion at the rear thereof is slightly greater than the corresponding spacing of the attaching portions on the receptacle means so that when the hood means is moved into operative position a spring force will be created by the resilient hood means tending to maintain the attaching portions at the sides thereof in operative position with the attaching portions at the sides of the receptacle means.

Referring now to FIGS. 6 and 7 of the drawings, a modified form of the invention is illustrated wherein the construction is substantially the same as that previously described, similar parts having been given the same reference numerals primed. The only difference in this form of the invention is in the construction of the attaching portions.

The attaching portions at opposite sides of the receptacle means include laterally extending generally cylindrical members 150 having enlarged heads 152 at the outer ends thereof. Members 150 also include reduced threaded portions 154 extending through a suitable hole provided in the associated flange of the receptacle means and having a nut 156 threaded on the inner end thereof.

The lower ends of each of the legs 52 and 54 of the associated hood means are provided with forwardly facing slots of a suitable dimension to receive cylindrical portions 150. As seen in FIG. 6, leg 52' is provided with a slot 158 whereby the hood means may be slid into the operative position illustrated.

Referring now to FIGS. 8–11 inclusive, still another form of the invention is illustrated wherein the receptacle means comprises a more or less conventional shovel having a rigid body portion 160 including flanges 162 and 164 at opposite sides thereof. The usual handle 168 is provided at the rear of the rigid body means 160. The receptacle means is provided with a pair of similar attaching portions 170 secured to the opposite sides thereof. As seen in FIG. 10, each of these attaching portions 170 includes a pair of angularly related legs 172 and 174, legs 170 being secured to the associated flange of the shovel as by welding or the like. Each of legs 174 has a rearwardly facing slot 176 formed therein.

Receptacle means is provided with a third spaced attaching portion which in this instance comprises a screw 180 threaded into the handle 168 of the shovel.

The hood means in this form of the invention includes a rigid framework including a forward crossmember 184 terminating in a pair of downwardly extending legs 186 and 188 extending substantially normally to crossmember 184. Lugs 190 and 192 are secured to the lower ends of legs 186 and 188 respective and define slots with the legs. One of these slots 194 is shown in FIG. 10 and is adapted to cooperate with the slot 176 in the associated attaching portion 170 for securing the forward portions of the hood means to the receptacle means.

The framework also includes a rear crossmember 200 terminating in downwardly extending legs 202 and 204 disposed substantially parallel with legs 186 and 188 respectively. A longitudinally extending frame member 210 is secured to each of members 184 and 200 of the framework as by welding or the like, member 210 including a rearwardly angularly disposed portion 212 having a terminal end 214 received under the head of screw 180 for securing the rear portion of the hood means in operative position.

The attaching portion at the rear end of the hood means also includes bracket member 216 of generally U-shaped configuration including a pair of parallel legs 218 and 220 which are adapted to fit on opposite sides of the handle of the shovel.

The hood means includes a covering which is also illustrated as comprising a metallic screen. The screen includes opposite side portions 230 and 232, a rear portion 234 and a top portion 236. The screen may be secured in position by clips as aforedescribed or may be simply wrapped around the frame members as shown in this embodiment.

Referring now to FIG. 11, the manner of forming the corners of the screen covering is shown. As seen in the upper portion of this figure, a flat piece of screen having a square corner thereon is initially cut along the lines indicated by reference character C. A triangular portion of the screen is then folded under as seen in the lower part of this figure whereupon the portions 234 and 232 are provided by folding these portions at right angles to the portion 236 whereupon the sides of the two portions 234 and 232 are overlapped with one another by folding triangular portion 240 over portion 234 as will be apparent. These overlapped portions can be secured to one another in any suitable manner.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A litter collector and removable hood means therefor comprising a rigid receptacle means including front and rear portions and a pair of side portions, said front portion including a litter-receiving edge, attaching means connected to said receptacle means and including at least three spaced attaching portions including an attaching portion at each of said side portions and an attaching portion at said rear portion, and removable hood means including front and rear portions and a pair of side portions, said hood means being open at said front portion, attaching means connected to said hood means and including at least three spaced attaching portions, one of said last-mentioned attaching portions being secured to each side portion of said hood means and one of said last-mentioned attaching portions being secured to the rear portion of said hood means, the attaching portions on the hood means cooperating with the attaching portions on said receptacle means to quickly connect and disconnect said hood means with respect to said receptacle means.

2. Apparatus as defined in claim 1 wherein said hood means comprises a rigid framework and a covering of open construction supported on said framework.

3. Apparatus as defined in claim 2 wherein said covering comprises a metallic screen.

4. Apparatus as defined in claim 1 wherein said attaching portions at each side portion of said receptacle means as well as each side portion of said hood means comprises slotted lugs.

5. Apparatus as defined in claim 1 wherein the attaching portion at the rear portion of said receptacle means comprises a forwardly extending lug, said attaching portion at the rear portion of said hood means comprising means defining a slot for receiving the lug, the components being so dimensioned that when said lug is in said slot, a forwardly directed force is produced on the hood means to hold the attaching portions at the side portions of the hood means and the receptacle means in engagement with one another.

6. Apparatus as defined in claim 1 wherein the attaching portions on the side portions of said receptacle means comprise laterally extending members, the attaching portions on the side portions of said hood means comprising slotted members for receiving said laterally extending members.

7. Apparatus as defined in claim 1 including a rearwardly extending handle connected with said receptacle means, the attaching portion at the rear portion of the hood means including a bracket member having legs fitting on opposite sides of said handle.

8. Apparatus as defined in claim 7 wherein the attaching portion at the rear portion of said receptacle means includes a member secured to said handle, the attaching portion at the rear portion of said hood means including a part fitting under the member secured to the handle.

9. Apparatus as defined in claim 1 including a carrying handle secured to the upper part of said hood means for carrying the hood means and receptacle means secured thereto.

10. Apparatus as defined in claim 9 wherein said handle includes a portion fixed with respect to said hood means and a second portion pivotally secured to said first portion.

* * * * *